(12) United States Patent
Fling et al.

(10) Patent No.: US 7,188,521 B2
(45) Date of Patent: Mar. 13, 2007

(54) HORIZONTAL LIQUID LEVEL MEASURING SYSTEM

(76) Inventors: William F Fling, P.O. Box 265, Little River, CA (US) 95456; John J. Fling, P.O. Box 265, Little River, CA (US) 95456

( * ) Notice: Subject to any disclaimer, the term of this patent is extended or adjusted under 35 U.S.C. 154(b) by 0 days.

(21) Appl. No.: 11/317,159

(22) Filed: Dec. 22, 2005

(65) Prior Publication Data

US 2006/0096369 A1 May 11, 2006

Related U.S. Application Data

(63) Continuation-in-part of application No. 10/737,349, filed on Dec. 15, 2003, now Pat. No. 7,043,983.

(51) Int. Cl.
*G01F 23/30* (2006.01)
(52) U.S. Cl. .............................. 73/320; 73/322; 73/305
(58) Field of Classification Search .................. 73/313, 73/314, 305, 317, 318, 319, 320, 321, 322, 73/322.5
See application file for complete search history.

(56) References Cited

U.S. PATENT DOCUMENTS

| | | | | |
|---|---|---|---|---|
| 1,453,716 | A | * | 5/1923 | Macgill ......................... 73/310 |
| 1,641,380 | A | * | 9/1927 | Geyer ........................... 73/305 |
| 2,371,511 | A | * | 3/1945 | Faus ............................ 116/284 |
| 3,161,055 | A | * | 12/1964 | De Giers ....................... 73/313 |
| 3,198,010 | A | * | 8/1965 | Huston ......................... 73/313 |
| 3,709,038 | A | | 1/1973 | Werner |
| 3,793,884 | A | | 2/1974 | Fling et al. |
| 4,092,861 | A | | 6/1978 | Fling |
| 4,147,060 | A | | 4/1979 | Fling et al. |
| 4,154,103 | A | | 5/1979 | Fling |
| 4,767,378 | A | * | 8/1988 | Obermann .................... 464/29 |
| 5,196,824 | A | | 3/1993 | Helm |
| 5,410,913 | A | * | 5/1995 | Blackburn .................... 73/313 |
| 5,945,913 | A | * | 8/1999 | Gallagher .................... 340/618 |
| 6,955,083 | B2 | * | 10/2005 | Fling et al. ................... 73/318 |
| 7,043,983 | B2 | * | 5/2006 | Fling et al. ................... 73/313 |
| 2002/0108441 | A1 | * | 8/2002 | Liu ............................... 73/305 |

* cited by examiner

*Primary Examiner*—Michael Cygan
(74) *Attorney, Agent, or Firm*—Lynn & Lynn (57) ABSTRACT

A liquid level measuring system includes a housing mounted to a container and a flexible coupling connected between the housing and a tubular frame suspended in a container holding a liquid. The flexible coupling maintains the tubular frame in a vertical orientation in the container. The tubular frame has a pair of 270° rifling grooves therein. A float is mounted in the tubular frame. The float has a pair of projections that extend from opposite sides portion thereof into the rifling grooves so that the float is force to rotate as it moves vertically in the tubular frame to seek the liquid level. A magnetic coupler assembly transfers movement of the float to an indicator. The magnetic coupler assembly includes a pair of facing dielectric discs. Each dielectric disc has three magnets mounted thereon with opposite poles facing one another.

9 Claims, 9 Drawing Sheets

HORIZONTAL LIQUID LEVEL MEASURING SYSTEM

CROSS REFERENCE TO RELATED APPLICATION

This is a continuation in part of applicants' application Ser. No. 10/737,349 filed Dec. 15, 2003 now U.S. Pat No. 7,043,983.

BACKGROUND OF THE INVENTION

The present invention relates generally to the measurement of the quantity of liquid in a container, vessel, barrel, drum, or the like. More particularly this invention relates to an improved liquid level measurement device having a float drive mechanism that includes a magnetic coupler arranged to activate an indicator pointer to indicate the liquid level in a container or the like.

DESCRIPTION OF PRIOR ART

There are many instances in which it is essential or desirable to be able to measure the level of liquid in a container, barrel, or the like, and in that manner determine the volume or quantity of liquid in the container. For example, numerous companies, business, shops, institutions and other organizations either transporting, storing or dispersing of liquid products, find it convenient to introduce chemicals, lubricants and fuels directly from shipping containers, i.e., drums, barrels, into their processes. This saves time and expense of having additional large bulk storage tanks and equipment to transfer the contents of the bulk storage tanks to the smaller containers. Drums are used throughout the world to transport, store, distribute, and dispense a variety of liquid products. For example, manufacturing firms use individual drums or an entire rack or rows of racks in their manufacturing processes. Material handling dealers and suppliers of chemical products package and distribute their liquid products in drums. In addition, farms, construction sites, schools, machine shops, printing firms, military, government, and numerous other organizations find the use of containers a useful way of handing their liquid products requirements.

A frequently used device for measuring the liquid contents of drums and or containers is a liquid level detector. There are a number of devices in the market place that serve this purpose. One of these devices is the standard sight gauge consisting of a metal pipe with a glass window to view of the level of liquid. The viewing glass has a gauge registered to the nearest gallon. In addition, the device is equipped with a T-connection threaded on one end to fit a standard ¾ inch threaded bunghole and to accommodate a faucet on the other end of the T-connection. The sight gauge devices suffer from a number of deficiencies that make them unsatisfactory for extended-life measuring purposes. For example, the device is not equipped with a pressure relief valve for drum venting purposes and must rely on a separate device to provide this capability. The glass view port is subject to fogging due to condensation and discolorization and lacks the convenience of a large dial for easy, at a glance reading. Also the external mounting design lends itself to damage through mishandling and breakage.

Another device in use in the measurement of drums, small tanks and containers is a self-contained unit with a magnet-equipped float that moves with the liquid level along the unit stem, inside the storage container. A liquid level readout is obtained by simply removing the protective cap at the top of the unit and lifting the calibrated indicator (within the unit) until magnetic interlock with the float is felt. The indicator is then lowered back inside the unit for storage and is protected by the screw cap when not in use. This unit suffers from a number of deficiencies, namely it is cumbersome to use, provides readouts in inches only, does not provide at-a-glance check of drum contents, and is not applicable to stack drum racks, and is restrictive in use in confined storage spaces were the drum must be moved to an open floor space to be used. This unit is not equipped with a built in pressure relief valve capability.

The wood dipstick is another method for measurement of container liquid levels but at best gives an approximate measurement of liquid levels. This approach is dependent upon the residual liquid wetline to indicate the liquid level in the container. The wet line is subjected to evaporation when exposed to air or to the elements, which distorts the accuracy of the measurement, and leads to approximate readings at best The gauge on the typical wood stick is not refined and therefore lacks accuracy and provides approximate measurements at best. The stamped painted gauge on the stick is subject to ware and fads in time. In addition, the wood construction of the stick leads to splintering and breakage over time.

Another device used to measure liquid levels within containers is a drum gauge that is confined to upright mounted drums. The device consists of an indicator with a plastic housing with an attached flexible rod, the top of which is affixed with a washer used as a pointer. The indicator is screwed into the drum bunghole for mounting to the drum. The indicator is inscribed with a scale calibrated in gallons, liters and inches. As float moves up or down with changing liquid levels the indicator rod with the attached washer pointer registers against the scale. As in the instance of the sight gauge device, the plastic indicator housing containing the imprinted scale is subject to the corrosive effects of fumes venting from the container into the indicator housing. In addition, the plastic housing is subject to fogging. These two conditions contribute to reduce visibility in viewing the readout of liquid levels and shorten the useful life of the device. In addition; the device tends not to deploy easily in a full drum condition because when the float and associated rod contact the liquid the unit extends in a horizontal direction and thus contacts the side of the drum prohibiting deployment. In a full drum, tank or container, the cap must be removed and an adjustment made prior to installation of a device for measuring the liquid level.

SUMMARY OF THE INVENTION

An object of the invention is to provide an improved liquid level measuring device for use in the side and end reading modes.

Another object of the invention is to provide improved performance, reliability, accuracy and diversity within competitive price structures and conventional manufacturing processes.

The liquid level measurement device according to the invention includes an indicator assembly having a 360° rotational movement for mounting on a container providing a pendulous self-aligning visual reading related to the level of the liquid in the container. The rotational feature of the indicator accommodates the movement of the indicator rather than requiring changing the position of the container to view liquid level measurements. The liquid level measurement device has a frame section that is threadedly mounted in the container's bunghole. The indicator is then snapped-on or threaded on the housing and frame section completing the installation. The frame has a buoyant float adapted for floating on the surface of the liquid in the container.

In a first preferred embodiment the liquid level measurement device has a straight drive rod formed as a 270° helix that passes through a hole in the float and serves as a driver for a first magnetic coupling, which together with a matching magnetic coupling contained in the indicator assembly comprises a magnetic coupling assembly. The magnetic coupling assembly provides the capability of using a sealed environment to convey the level of liquid in a container by the use of magnetics, which eliminates the requirements for the conventional shaft, and bearing combination, which prevents a sealed environment.

The straight drive rod is connected to a flexible coupling that is in turn connected to a rod arranged to rotate a first portion of the magnetic coupler. The magnetic coupler then transfers this rotation to the indicator dial. The flexible coupling provides the capability of using the invention to measure liquid depth in both horizontally and vertically oriented containers.

A second preferred embodiment of a liquid level measuring system according to the invention includes a housing arranged to be mounted to the container with a flexible coupling having a first end connected to the housing. A tubular frame is connected to a second end of the flexible coupling so that the tubular frame is suspended in the container. The flexible coupling is arranged to maintain the tubular frame in a vertical orientation in the container when the actuator and the housing are out of vertical alignment. The tubular frame has a pair 270° rifling grooves therein. A float is mounted in the tubular frame. The float has a pair of projections that extend from opposite sides portion thereof into the rifling grooves so that the float is force to rotate as it moves vertically in the tubular frame. The float has a central lengthwise passage therein with a drive rod being mounted in the tubular frame to extend lengthwise therethrough and to extend through the central passage in the float. The central passage and the drive rod are configured such that rotation of the float in the tubular frame causes the drive rod to rotate. The drive rod has an upper end that is connected to the flexible coupling so that the flexible coupling rotates with the drive rod.

A magnetic coupler assembly is arranged to transfer movement of the flexible coupling to the indicator. The magnetic coupler assembly includes a first dielectric disc connected to the flexible coupling. The first dielectric disc has three magnets mounted thereon with their poles facing upwards. A second dielectric disc is connected to the indicator assembly. The second dielectric disc has three magnets mounted thereon with their poles facing downwards such that opposite poles mounted on the first and second dielectric discs are arranged with opposite poles in facing relationship such that magnetic forces transfer rotation of the drive rod to the indicator assembly.

The three magnets on the first dielectric disc are arranged so that two North poles and one South pole facing upwards and the three magnets on the second dielectric disc are arranged so that one North pole and two South poles are facing downward.

Each of the projections preferably is spring biased into the corresponding 270° rifling grooves.

The liquid level measuring system preferably further comprises an insert formed of a non-magnetic material mounted in the housing between the first and second dielectric discs and arranged to form a liquid-tight seal for the container. The indicator assembly preferably is detachable from the housing while the housing is mounted in a bung hole in the container so that the container may be stored or shipped without the indicator assembly while the housing and the tubular frame are inside the container.

DETAILED DESCRIPTION OF THE INVENTION

Figure 1:
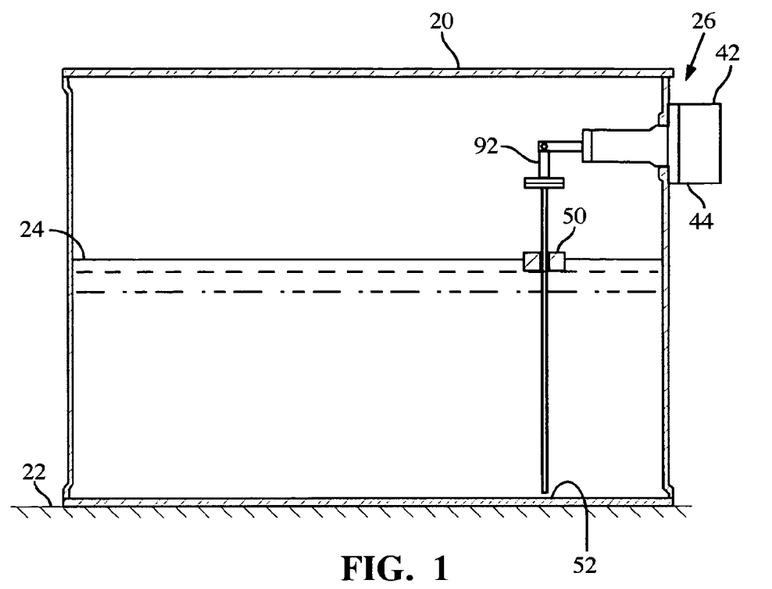
FIG. 1 is shows an embodiment of the present invention mounted for use on a horizontally oriented container.
Figure 2:
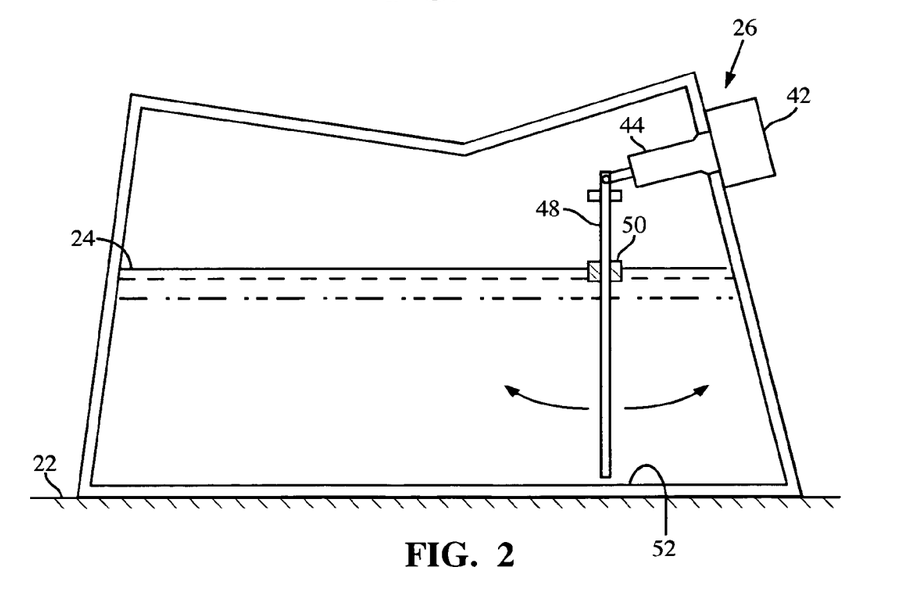
FIG. 2 shows the embodiment of FIG. 1 used with a horizontally oriented container that has been deformed.
Figure 3:
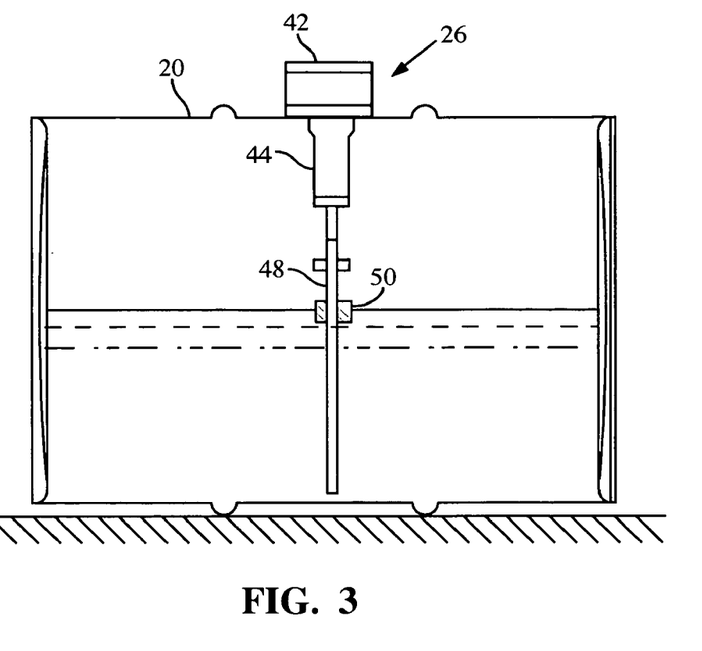
FIG. 3 shows the invention being used with a horizontally mounted container using the mid-container bunghole.
Figure 4:
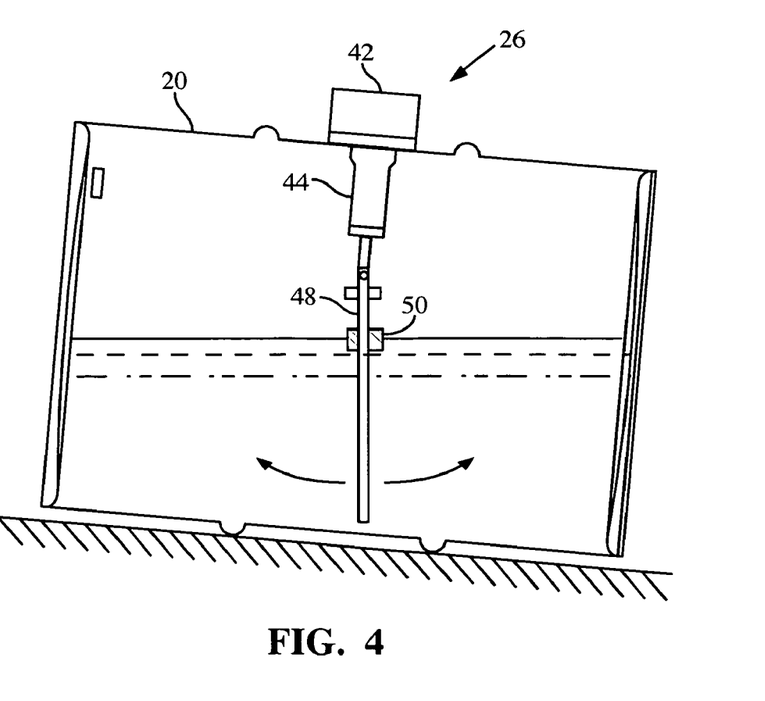
FIG. 4 shows the invention being used with a container resting on a surface that is not level.

Turning now to the drawings and particularly to FIG. 1, a container 20 is depicted for illustrative purposes as being located on a level surface 22 and partially filled with a liquid 24. A liquid level measurement device 26 according to the invention is mounted to the container 20. It is a primary purpose of the liquid level measurement device 26 to measure the depth of the liquid 24 from which (knowing the tank geometry) the volume of liquid 24 in the container 20 can be determined.

Figure 5:
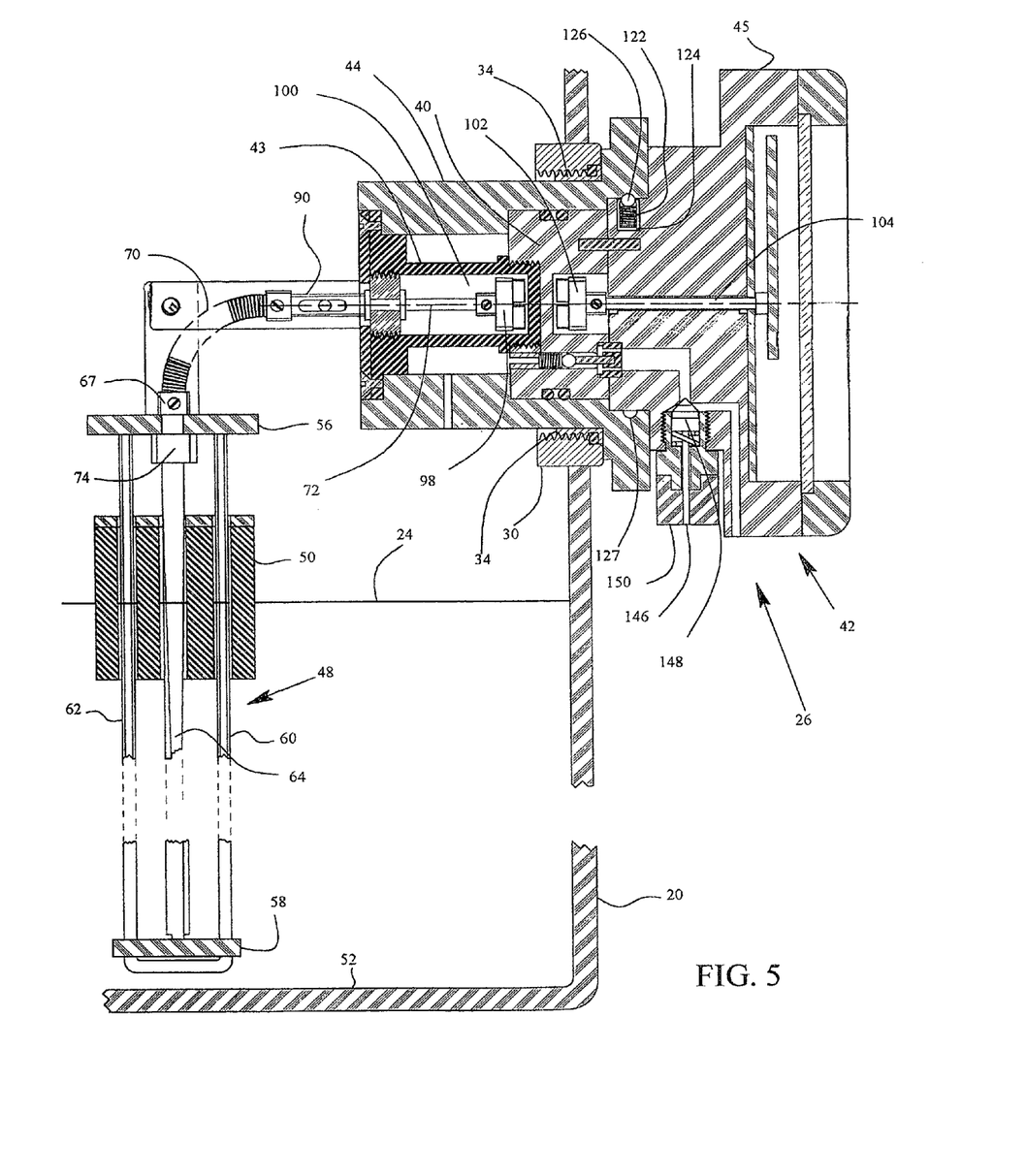
FIG. 5 is a partial cross sectional view showing structural features of the invention being used with a horizontal container
Figure 6:
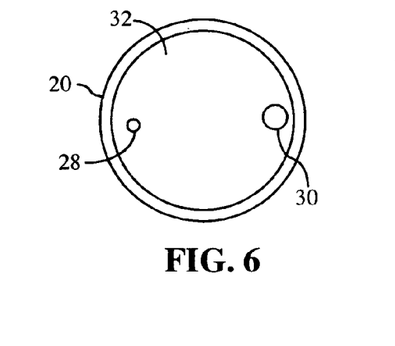
FIG. 6 is an end view of a conventional container used to hold liquids.
Figure 7:
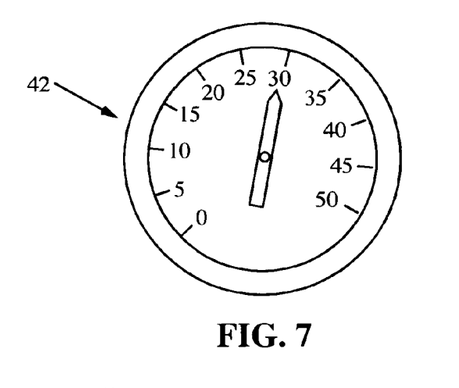
FIG. 7 is an end view of an indicator dial that may be used with the present invention.

Referring to FIGS. 1 and 6, the container 20 typically has openings 28 and 30 provided in a lid 32 for adding or dispensing liquids. The openings 28 and 30 typically are threaded and have diameters of 0.75 inch and 2 inches respectively. As shown in FIG. 5, the liquid level measurement device 26 has a threaded coupling 34 that may be used to mount the liquid level measurement device 26 in the opening 30.

The liquid level measurement device 26 according to the invention may be advantageously employed for measuring liquids of great variety in tanks. It is considered within the sprit of this invention to make the measurement device small-sized for uses such as measuring liquid depth in drums, barrels, jumbo, square shop tanks, oval shaped tanks for shop, home heating generators and numerous other applications. Therefore, for the convenience of description of the invention, it is described in connection with measuring the depth (and thus amount) of liquids stored and dispensed in such containers.

The liquid level measurement device 26 includes an indicator 42, a housing 44, an upper frame section 45 extending from the housing 44, a lower frame section 48 that extends into the liquid 24 and a float 50 that moves along the lower frame section 48 in response to changes in the liquid level indicated by a wet line 51. The lower frame section 48 is an elongated structure having an overall length such that it extends to a location near the lowermost portion 52 of the container 20. Differing containers have varying lengths, and to conform to this requirement the frame section along with the fractional turn helical drive rod and the guide bars can be modified to conform to differing dimensions of the containers involved.

The lower frame 48 includes an upper plate 56 and a baseplate 58 with a pair of guide bars 60 and 62 arranged to extend between them. The fractional turn helical drive rod 64 has a bottom projection 66 that extends into a recess 68 in the baseplate 58. The helical drive rod has an upper end 67 that is connected to a flexible shaft 70 that is in turn connected to a rod 72 through variable length coupler 90. The flexible coupling 70 has an upper portion 71 that passes through a support member 46 that extends from the housing 44. A lower portion 73 of the flexible coupling 70 passes through a guide member 92 having an end 67 that is pivotally connected to and end 91 of the support member 46. The flexible coupling 70 permits the lower frame assembly to rotate more than 90° relative to the upper frame section 44. Rotation could exceed 90° when a drum or container is lifted at one end to tilt it so that it may be completely emptied of a liquid contained therein. It should be noted that the flexible coupling 70 allows rotation of the lower frame in two vertical planes.

The fractional turn helical drive rod 64 is suspended between the guide bars 60 and 62. The lower ends of the guide bars 60 and 62 may be fastened to the base plate 58. The upper ends of the guide bars 60 and 62 are connected to the upper plate 56. The fractional turn helical drive rod 64 is suspended centrally between the guide bars 60 and 62 with the upper end of the fractional turn helical drive rod 64 extending through a passage 74 in the upper plate 56.

Figure 8:
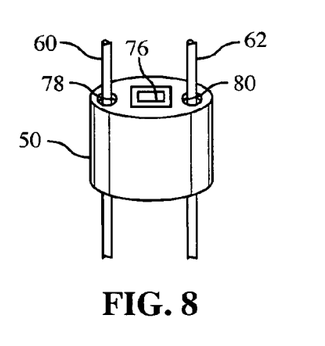
FIG. 8 is a perspective view of a float and guide and guide bar arrangement that may be included in the present invention.

Referring to FIGS. 5 and 8, the float 50 preferably is formed as a cylinder and preferably has a central passage 76 extending therethrough. The passage 76 preferably extends through the center of the float 50 and has a square cross section. A pair of circular passages 78 and 80 is formed near opposite side portions of the float 50. The float 50 is mounted in the frame so that the guide bars 60 and 62 extend through the passages 78 and 80 and the fractional turn helical drive rod 64 extends through the passage 76. The guide bars 60 and 62 are parallel so that the float 50 is constrained to linear movement up and down as the liquid level changes in the container. The fractional turn helical drive rod 64 can be rotated about its vertical axis. As the height of the float 50 changes, the square cross section fractional turn helical drive rod 64 engages the surfaces of the square central passage, which produces a torque on the fractional turn helical drive rod 64. The liquid level measurement device 26 is calibrated so that the angular orientation of the fractional turn helical drive rod 64 as it rotates about the vertical axis indicates the liquid level in the container 20.

Figure 9:
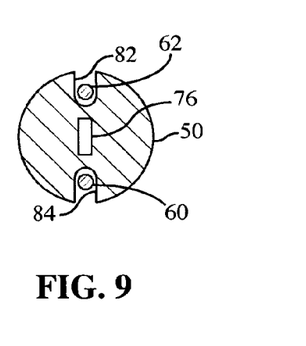
FIG. 9 is a cross sectional view showing a float and a pair of guide rods that may be used with the embodiment of the invention shown in FIG. 4.
Figure 10:
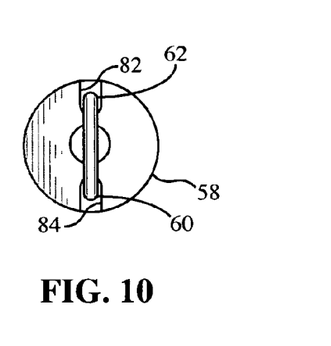
FIG. 10 is a bottom plan view showing guide rods and an base plate that may be included in the present invention.
Figure 11:
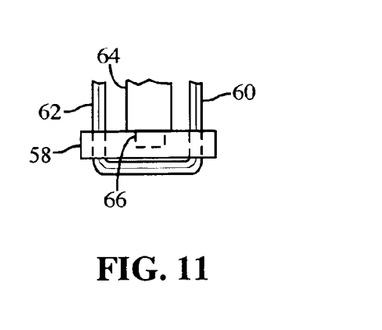
FIG. 11 is a side elevation view showing a base plate and bottom end portions of the guide rods of FIG. 9.

Referring to FIGS. 9–11, instead of having cylindrical passages 78 and 80, the float 50 may include a pair of slots 82 and 84. The slots 82 and 84 extend the full length of the cylindrical float 50 and are arranged to be diametrically opposite one another. The guide rods 60 and 62 fit inside the slots 82 and 84 so that the float 50 is constrained to vertical movement along the guide rods. The lower ends of the guide rods 60 and 62 may be connected together below the base plate 58 as shown in FIGS. 10 and 11.

As the device 26 is inserted and secured to the container 20 by threading into the selected container hole, the liquid level measurement device 26, as a two axis pendulous system, self aligns seeking the local vertical to adjust for any small angle in any two-plane container orientation. As the lower frame section 48 is inserted into the container 20, the float 50 tends to seek the level of the liquid 24 contained therein.

Figure 12:
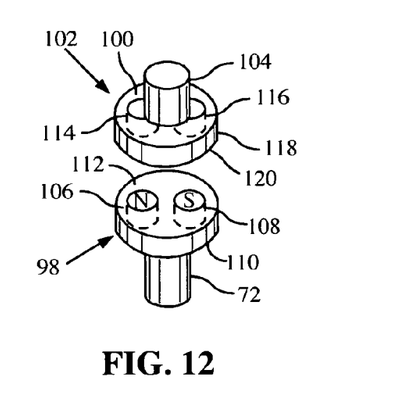
FIG. 12 is a perspective view showing a magnetic coupler that may be included in the present invention.

As shown in FIGS. 5 and 12, the rod 72 is connected to a first magnetic assembly 98 to support it in a cavity 100 in the housing 43. A second magnetic assembly 102 is mounted in the cavity 100 by a rod 104 that is rotatably mounted in the housing 45. The first and second magnetic assemblies 98 and 102 are on opposite sides of the insert 40. As shown in FIG. 12, the first magnetic assembly 98 comprises a pair of magnets 106 and 108 mounted in a disk 110 with opposite poles being adjacent an end 112. The second magnetic assembly 102 comprises a pair of magnets 114 and 116 mounted in a disk 118 with opposite poles being adjacent an end 120. The magnetic assemblies 98 and 102 are arranged so that magnets of opposite polarity face one another. Because the magnetic poles of opposite polarity attract one another through the dielectric insert 40, they automatically align and remain in alignment as the helical drive rod 64 and the rod 72 rotate in response to changes in the liquid level.

The magnet assemblies 98 and 102 are arranged so that they are attracted to one another such that rotation of the first magnet assembly 98 causes rotation of the second magnet assembly 102.

The employment of the magnetic coupler approach makes possible another embodiment of the present invention. As shown in FIG. 5, the indicator 42 is arranged to be snap-fit on the housing 44. A spring 122 is mounted in a cavity 124 in the housing 45. A plunger 126 is fastened to the spring 122. The housing 44 includes a groove 127 arranged to receive the plunger when sufficient force is used to urge the indicator 42 toward the housing 44. Locating pin 130 secures indicator 42 to insert 40. The insert 40 preferably is formed of a non-magnetic material and is arranged to form a seal to prevent liquid from escaping from the container 20. The indicator 42 can be easily removed from one container and attached to another. This embodiment of the invention permits multiple measurements of similar configured containers with a single indicator in addition to protecting the indicator from damage through miss handling and damage from material handling equipment. In the event that the container is positioned in a protective cabinet or the like, the indicator 42 can be removed for clearance purposes.

When the indicator 42 is removed, from the housing 44, the first magnetic 98 assembly remains in the position it was in while the indicator was attached if no liquid is removed from the container 20. The angular position of the first magnetic assembly 98 is a function only of the liquid level. When the indicator 42 is reattached to the housing 44, the second magnetic assembly 102 returns to its previous angular position to indicate the liquid level.

In addition, this use of a magnetic coupler provides a sealed environment between the contents of the container 20 and the outer environment and eliminates the need for conventional shafts and prevents the associated leakage of fumes and liquid that can contaminate instrument components and the environment. The magnetic coupler feature also provides for the means for the snap on snap off feature of the indicator that permits the removal of the indicator from the device with out the need to remove the entire device from the container or the like. This feature also accommodates the multiple readings of numerous containers with a single indicator and hence avoiding contamination of liquid products. The sealed containment feature makes it possible to ship containers with internally mounted devices less the indicator. Another feature of the device is the use of the flexible coupling 70 to accommodate the free axial movement of the frame section 48 of the device and assure a continual alignment with the vertical.

Figures 13, 14, 15:
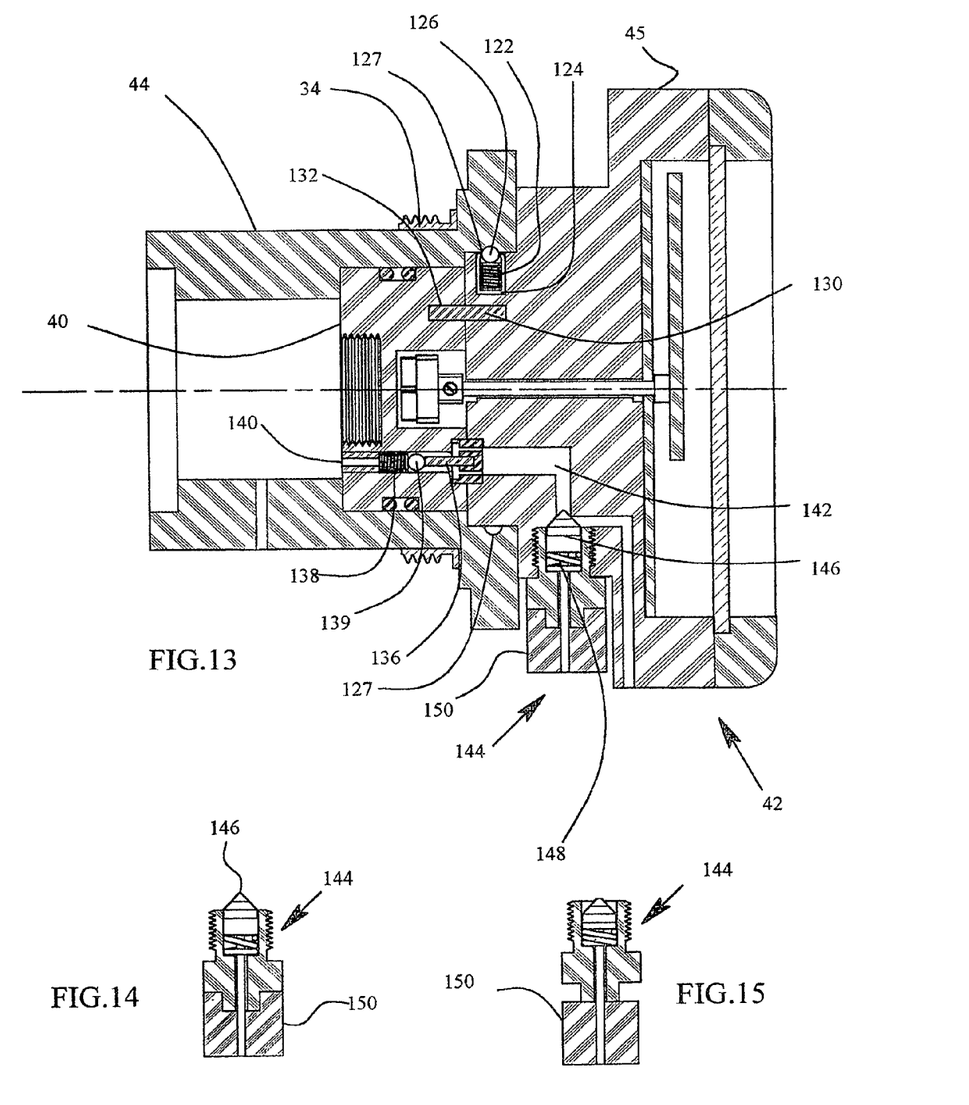
FIG. 13 illustrates structural features of a venting system including the "snap-fit" capability of the indicator that may be included in the embodiment of the invention shown in FIG. 5.
FIG. 14 is a cross sectional view of a pressure relief system that may be included in the invention shown in a closed position.
FIG. 15 is a cross sectional view showing the pressure relief system of FIG. 14 in an open position.

Referring to FIGS. 5 and 13, the invention includes a pressure relief system 144 for venting to relieve pressure caused by heating and to prevent formation of a partial vacuum when the liquid cools and when liquid is drained from the container 20. When the indicator assembly 42 is attached to the housing 44, an indicator guide pin 130 aligns with a guide pin receptor hole 132 in the insert 40. As best shown in FIG. 13, in the automatic venting mode a plunger pin 136 compresses a spring 138 permitting ball 139 to open a vent hole 140 in the insert 40. The venting action passes through a vent passage 142 to a pressure release assembly 144 that includes a piston 146, a spring 148 and a cap 150. As the venting pressure impacts the piston 146, the spring 148 contracts to permit the piston 146 to assume an open position, which relieves the pressure in the container 20. As shown in FIGS. 14 and 15, the pressure relief system 144 may be manually opened by pulling outward on the cap 150 and then turning it to lock it in an open position.

A second embodiment of the invention is shown in FIGS. 16–26. As may be seen from FIG. 16, a liquid level measuring device 200 includes the indicator 42, the housing 44 and the flexible shaft 70 of the liquid level measuring device 26 shown in FIGS. 1–15. The following description of the second embodiment of invention will point out features of the liquid level measuring device 200 that are not included in the liquid level measuring device 26.

Referring to FIGS. 16–20, a tubular frame 202 has an upper plate 210 that is connected to the support members 92 and 45 an to pivot pin 91. The frame section 202 is formed generally as a hollow cylinder having an inner wall 203. A drive rod 204 is mounted inside the frame section 202. Differing containers have varying lengths, and to conform to this requirement, the frame section 202 along with the drive rod 204 can be modified to conform to differing dimensions of the containers involved. The frame section 202 includes a pair of diametrically opposed 270° degree rifling grooves 206 and 208 formed in the inner wall 203 of the tubular frame 202.

Figure 16:
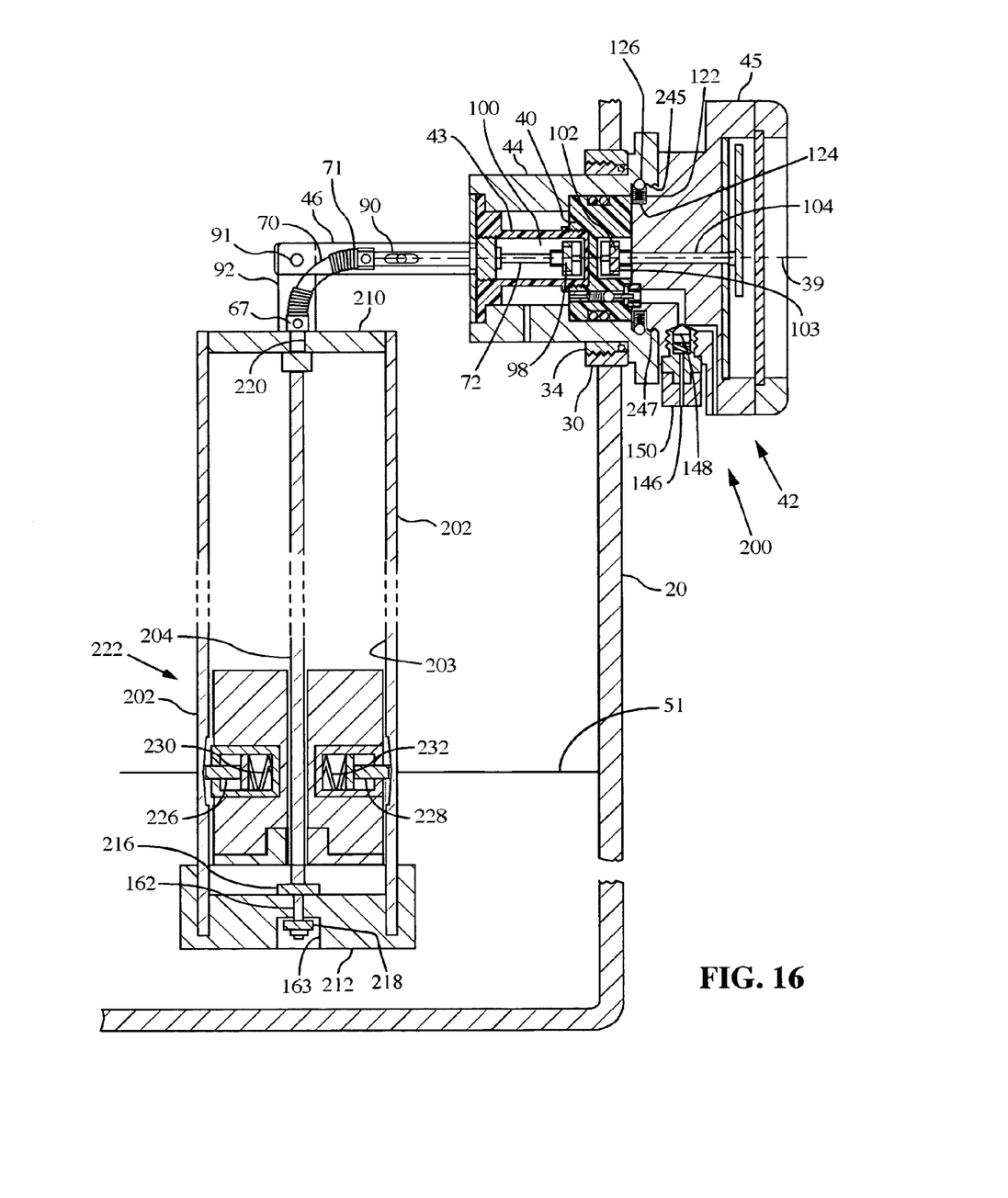
FIG. 16 is a cross-sectional view of a second embodiment the present invention.

The rifling slots extend between the upper plate 210 and a base plate 212. The drive rod has a bottom projection 162 that extends into a recess 136 in the base plate 212. The drive rod 204 has an upper end that extends through a passage 220 in the upper plate 210 and is connected to the bottom end 67 of the flexible shaft 70, which is connected to the rod 72 as described previously through the variable length coupler 90. The lower end of the drive rod 204 may be fastened to the base plate 212 by a washer 216 and a snap ring 218.

Figures 17, 18:
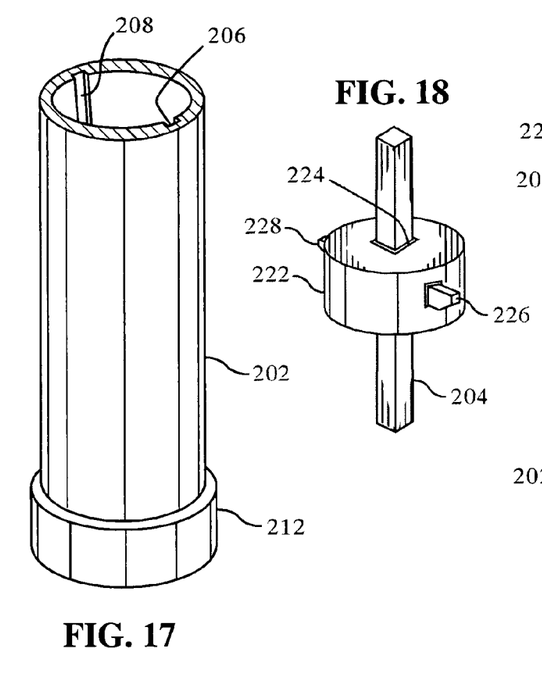
FIG. 17 is a perspective view of a portion of a frame that may be included in the present invention showing a pair of slots that may be inside the frame.
FIG. 18 is a perspective view showing a float and a portion of a control rod that may be included in the present invention.
Figure 19:
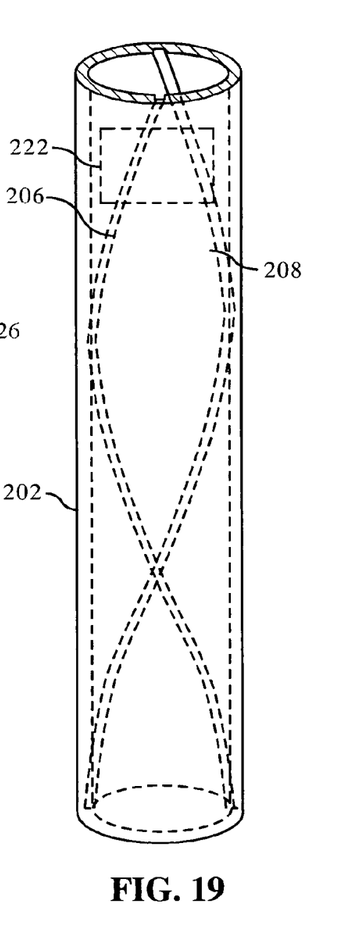
FIG. 19 is a perspective view of a frame that may be included in the present invention showing the slots of FIG. 17 formed to have 270° helical configurations.
Figure 20:
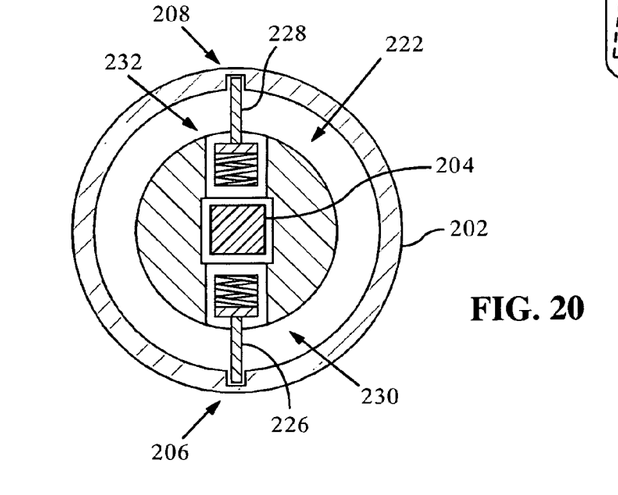
FIG. 20 is a partial cross sectional view showing the float of FIG. 18 inside the frame of FIG. 19.

The liquid level measuring device 200 includes a float assembly 222 that preferably is formed as a cylinder and preferably has a square central passage 224 extending throughout. Referring to FIGS. 16, 18 and 20, a pair of guide pins 226 and 228 is mounted at opposite side portions of the float assembly 222. Referring to FIGS. 16, 19 and 20, the float assembly 222 is mounted in the tubular frame 202 so that the guide pins 226 and 228 extend by the action of a pair of corresponding compression springs 230 and 232 into the rifling grooves 206 and 208, respectively. The drive bar 204 extends through the passage 224 so that as the float assembly translates in the vertical direction, it simultaneously rotates in the horizontal plane as it traverses the 270° rifling grooves 206 and 208. The drive rod 204 in turn rotates about the vertical axis. As the height of the float assembly 222 changes, the square cross section of the drive rod 204 engages the surface of the square central passage 224, which produces a torque on the drive rod 204. The liquid level measurement device 200 is calibrated so that the angular orientation of the drive rod 204 as it rotates about the vertical axis indicates the liquid level in the container 20.

Figure 21:
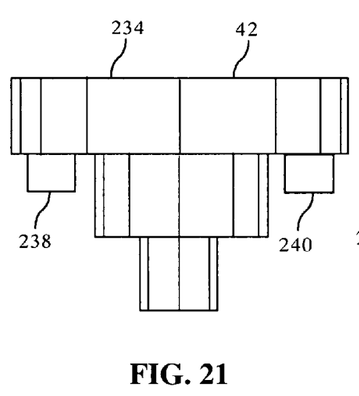
FIG. 21 is a side elevation view of an indicator assembly showing alignment indices.
Figure 22:
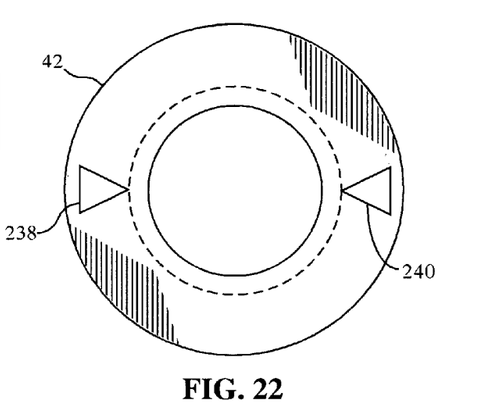
FIG. 22 is a bottom plan view of the indicator assembly of FIG. 21.
Figures 23, 24, 25:
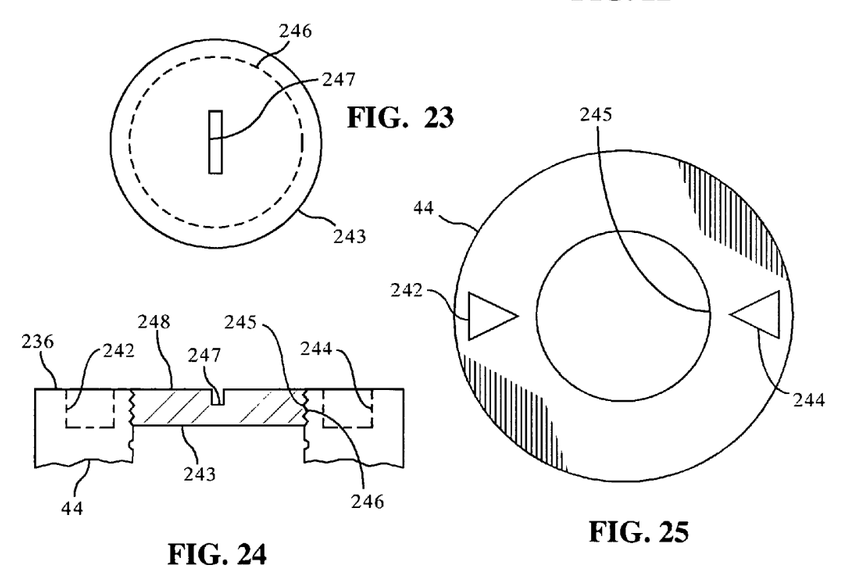
FIG. 23 is a top plan view of a cap that may be used to seal the housing of the lower frame assembly from dirt, contamination or external damage when the indicator assembly has been removed from the housing.
FIG. 24 is a side elevation view of an upper portion of the housing showing the cap of FIG. 23 in cross section.
FIG. 25 is a top plan view of the portion of the housing shown in FIG. 24 showing recesses for the alignment indices shown in FIG. 21.

FIGS. 21–25 illustrate structural features that relate to mounting the indicator assembly 42 to the housing 44. Simplified representations of a bottom portion 234 of the indicator assembly 42 and an upper portion 236 of the housing 44 are shown in these figures. As shown in FIGS. 21 and 22, the bottom portion 234 of the indicator 42 includes a pair of alignment indices 238 and 240 projecting therefrom. When the indicator assembly 42 is mounted to the housing 44, the alignment indices 238 and 240 project into corresponding receptor recesses 242 and 244. FIGS. 22 and 24 show the alignment indices 238 and 240 and the corresponding receptor recesses 242 and 244 having triangular shapes as examples. They can have any suitable shape. An end user of the liquid level measuring device can specify a shape that will be unique to the user.

FIG. 23 is a top plan view showing a cap 243 that may be used to seal a threaded end opening 245 of the housing 44. The cap 243 is shaped essentially as a cylinder and has side threads 246 that match the threads 245 of the housing 44. The cap 243 may be used when the indicator assembly is removed from a container that still contains a liquid. The cap 243 preferably has a slot 247 in a central region of its upper surface 248. A tool (not shown) may be engaged in the slot 247 to attach it to the housing 44 or to remove it from the housing 44.

Figure 26:
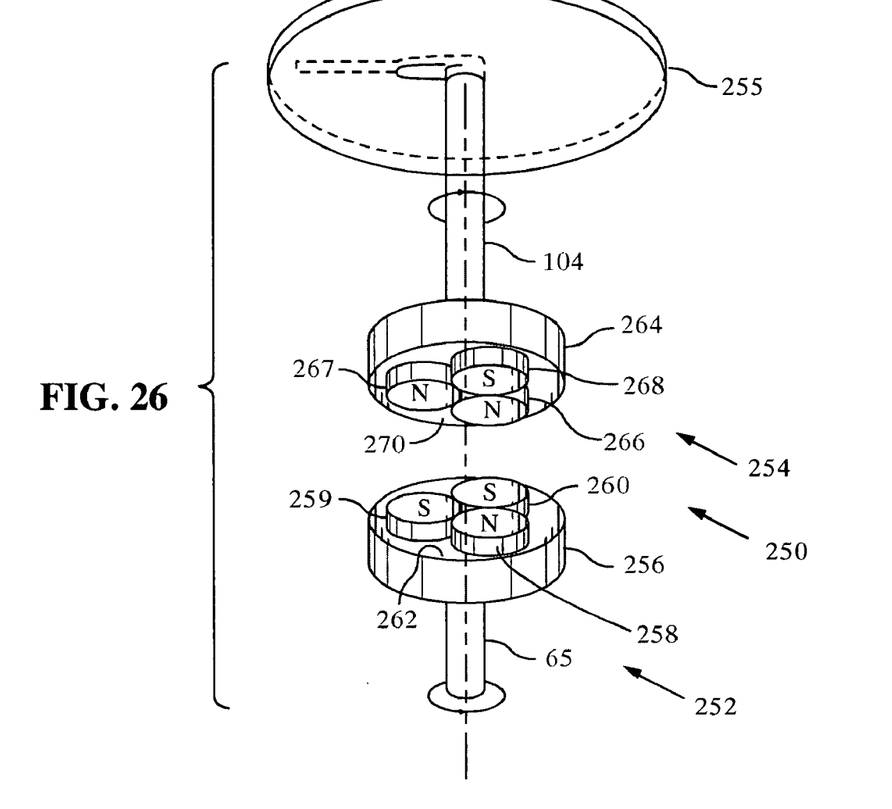
FIG. 26 shows a magnetic coupling assembly that includes two facing clusters of magnets.
Figure 27:
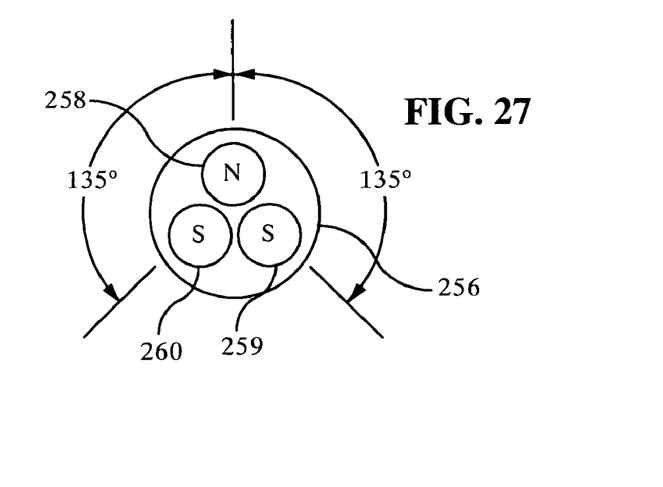
FIG. 27 is an end elevation view showing a cluster of three magnets arranged to be 135° apart.

Referring to FIGS. 26 and 27, the liquid level measuring device 200 preferably includes a magnetic coupling mechanism 250. The magnetic coupling mechanism 250 includes a pair of substantially identical magnetic assemblies 252 and 254. The magnetic assembly 252 includes a first dielectric disc 256 mounted to the rod 65. An indicator 255 may be connected to the rod 104. Three magnets 258–260 are fixed to the upper surface 262 of the dielectric disc 256. The magnet 258 has its North pole facing upward, whereas the South poles of the magnets 259 and 260 face upward as seen in FIG. 26. The magnetic assembly includes a second dielectric disc 264 and three magnets 266–268 mounted on its lower surface 270. The magnets 266–268 are arranged so that they have opposite poles facing the poles of the magnets 258–260.

As shown in FIG. 27, the magnets 258–260 are arranged on the dielectric disc 256 so that the magnets 259 and 260 that have the same polarity are displaced by 135° from the magnet 258, which has polarity opposite from that of magnets 259 and 260.

The magnets 258–260 and 266–268 preferably are formed of a Neodymium-Iron-Boron alloy and preferably exert an attractive force between the magnetic assemblies 252 and 254 of about 2.8 to 4.0 pounds. The magnets 258 and 268 preferably have at least twice the pole strength of the other magnets in the magnetic assemblies 252 and 254. The arrangement of three magnets in each magnetic assembly 252 and 254 provides for about 30% more magnetic coupling force than can be achieved with the conventional two pole arrangement and significantly reduces hysteresis effects. Forming the magnetic assembly 252 to have two South magnetic poles and one North magnetic pole and the magnetic assembly 254 to have one South pole and two North poles allows a 270° degree rotation of the rods 65 and 104 (and the indicator 255) without ambiguity.

The capability of having a 270° rotational range without ambiguity is significant in that the magnetic assembly 254 and its indicator 255 are designed to be removable from the frame 44.

Although the present invention described in connection with a preferred embodiment it is to be understood that modifications within the scope of the invention may occur to those skilled in the appertaining art.

What is claimed is:

1. A liquid level measuring system that actuates an indicator assembly in response to depth of a liquid confined to a container, comprising:
   a housing arranged to be mounted to the container
   a flexible coupling having a first end and a second end, the first end being connected to the housing;
   a tubular frame connected to the second end of the flexible coupling so that the tubular frame is suspended in the container, the flexible coupling being arranged to maintain the tubular frame in a vertical orientation in the container when the actuator and the housing are out of vertical alignment, the tubular frame having a 270° rifling groove therein;
   a float mounted in the tubular frame, the float having a projection that extends from a side portion thereof into the rifling groove so that the float is force to rotate as it moves vertically in the tubular frame, the float having a central lengthwise passage therein;
   a drive rod mounted in the tubular frame to extend lengthwise therethrough and to extend through the central passage in the float, the central passage and the drive rod being configured such that rotation of the float in the tubular frame causes the drive rod to rotate, the drive rod having an upper end that is connected to the flexible coupling so that the flexible coupling rotates with the drive rod;
   a magnetic coupler assembly arranged to transfer movement of the flexible coupling to the indicator, the magnetic coupler assembly including:
      a first dielectric disc connected to the flexible coupling, the first dielectric disc having three magnets mounted thereon with their poles facing upwards; and
      a second dielectric disc connected to the indicator assembly, the second dielectric disc having three magnets mounted thereon with their poles facing downwards such that opposite poles mounted on the first and second dielectric discs are arranged with opposite poles in facing relationship such that magnetic forces transfer rotation of the drive rod to the indicator assembly.

2. The liquid level measuring system of claim 1 wherein the three magnets on the first dielectric disc are arranged so that two North poles and one South pole facing upwards and the three magnets on the second dielectric disc are arranged so that one North pole and two South poles are facing downward.

3. The liquid level measuring system of claim 2 wherein the tubular frame includes a pair of diametrically opposed 270° rifling grooves and wherein the float includes a pair of projections arranged so that each one of the pair of projections extends into a corresponding one of the 270° rifling grooves.

4. The liquid level measuring system of claim 2 wherein each of the projections is spring biased into the corresponding 270° rifling grooves.

5. The liquid level measuring system of claim 1 wherein the tubular frame includes a pair of diametrically opposed 270° rifling grooves and wherein the float includes a pair of projections arranged so that each one of the pair of projections extends into a corresponding one of the 270° rifling grooves.

6. The liquid level measuring system of claim 5 wherein each of the projections is spring biased into the corresponding 270° rifling grooves.

7. The liquid level measuring system of claim 1, further comprising a non-magnetic insert mounted in the housing between the first and second dielectric discs and being arranged to form a liquid-tight seal for the container.

8. The liquid level measuring system of claim 7 wherein the indicator is detachable from the housing while the housing is mounted in a bung hole in the container so that the container with the housing mounted therein with the tubular frame being inside the container may be stored or shipped without the indicator being attached to the housing.

9. The liquid level measuring system of claim 8, further comprising a cap that may be mounted to the housing to replace the indicator.

* * * * *